United States Patent [19]

Roger

[11] 3,724,818
[45] Apr. 3, 1973

[54] VALVE CLAMP FOR ELASTICALLY DEFORMABLE TUBES

[76] Inventor: Albert J. Roger, 5200 E. 12th Street, Oakland, Calif. 94601

[22] Filed: Mar. 10, 1971

[21] Appl. No.: 122,779

[52] U.S. Cl..................251/9, 24/126 R, 24/132 WL
[51] Int. Cl...............................................F16k 7/06
[58] Field of Search..........251/4, 6, 7, 9, 10; 24/126, 24/132 WL

[56] References Cited

UNITED STATES PATENTS

| 3,497,175 | 2/1970 | Koland | 251/9 |
| 492,580 | 2/1893 | Hadley | 251/9 X |
| 2,519,909 | 8/1950 | Johnson | 251/10 |
| 3,329,391 | 7/1967 | Deane | 251/7 |
| 3,550,900 | 12/1970 | Rolin | 251/9 |

Primary Examiner—Henry T. Klinksiek
Assistant Examiner—Richard Gerard
Attorney—Joseph B. Gardner

[57] ABSTRACT

A clamp for use with an elastically deformable tube to provide a valve therefor operative to selectively meter or stop the flow of fluid therethrough. The clamp includes an elongated hollow housing having openings in its opposite end walls defining a passageway through which such tube extends. An elongated leaf spring defining a valve element extends longitudinally within the housing along one side of the passageway and is normally biased outwardly therefrom toward a completely open position in which it does not appreciably deform or crimp the tube. A slide forming a control element is mounted within the housing for reciprocable longitudinal displacement generally along the spring through a path of movement which is angularly disposed with respect to the passageway and converges therewith in one direction. Movement of the slide in the direction toward the passageway forces the spring into engagement with any tube therein and causes the same to deform and thereby progressively restrict the fluid flow therethrough until complete stoppage occurs in the fully closed position of the spring.

4 Claims, 4 Drawing Figures

PATENTED APR 3 1973 3,724,818

INVENTOR.
ALBERT J. ROGER
BY Joseph B. Gardner

VALVE CLAMP FOR ELASTICALLY DEFORMABLE TUBES

BACKGROUND OF THE INVENTION

This invention relates to metering clamps for use with compressible or elastically deformable tubes and, by way of example, to a metering clamp for use with irrigation tubes and the like to provide selective adjustable control over the flow of fluid therethrough from uninhibited flow to complete stoppage thereof.

There are many uses of elastically deformable tubes such as those made of certain plastics or of rubber, either natural or synthetic, and one such use is that in which the flow of fluid through the tube is to be closely controlled or regulated without contact with the fluid and quickly stopped in a positive manner whenever necessary. For instance, tubes of this type are often used for conveying fluids to a patient both for intravenous injection and for other applications. In any such use, it is necessary not only to be able to regulate the rate at which fluid is permitted to flow through the tube, but also to be able to quickly stop the flow. While various clamps and other arrangements for this purpose have been provided in the past, they have each suffered from one or more deficiencies. For example, one clamp often used has the disadvantage that it can slide along the tube under its own weight when it is open or not adjusted to deform the tube. Such movement of the clamp along the tube can make the clamp difficult to find in an emergency situation, and it could position the clamp out of convenient reach of the person using the clamp. Another disadvantage of most clamps now available is that the tube clamping components are exposed and are therefore subject both to damage and to accidental movement in handling. In general, effective clamps which do not have these and other disadvantages are too complicated and expensive to be competitive with the less effective clamps.

SUMMARY OF THE INVENTION

The present invention relates to a clamp for throttling or metering and for completely stopping flow through an elastically deformable tube, and which clamp does not have many of the disadvantages inherent in prior clamp designs but which nevertheless can be inexpensively made. In its basic aspects, the clamp of the invention comprises an elongated hollow housing which has a passageway extending longitudinally therethrough for reception of that portion of a tube at which it is desired to be able to throttle or to completely stop flow therethrough. A leaf spring defining a valve element is located within the housing along one side of the passageway and is normally biased outwardly therefrom to a location at which it does not block the same or deform any tube positioned therein. A reciprocable slide forming a control element is also provided within the housing along one side of the spring, and it is constrained within the housing for movement along a path that extends angularly toward and into the passageway for progressively forcing the spring into the passageway and against the wall of any tube extending therethrough to deform the tube to thereby restrict or stop fluid flow therethrough. Manually manipulatable actuating means secured to the slide extends therefrom to the exterior of the housing and to a location at which it is readily accessible for manipulation in order to move the slide.

Most desirably, the housing completely encloses the various components of the clamp (i.e., the leaf spring and the slide) so that they are not exposed, and one not familiar with the operation of the clamp cannot mistakenly manipulate the wrong portion thereof to damage the same. Only the actuating means extending outwardly from the housing is accessible for manipulation. Also, the clamp desirably includes means for assuring that it stays at any location at which it is positioned along the tube. Most simply, this means can be in the form of a projection that extends a short distance inwardly toward the center of the passageway to slightly deform or bend a tube therein and frictionally engage the same so that a positive manual force is necessary to move the clamp along the tube.

The invention includes other features and advantages which will become apparent from the more detailed description hereinafter.

BRIEF DESCRIPTION OF THE DRAWING

With reference to the accompanying drawing:

FIG. 1 is an isometric view of a preferred embodiment of the inventive clamp positioned on a compressible fluid flow tube or the like;

DETAILED DESCRIPTION OF THE PREFERRED EMBODIMENT

Figure 1:
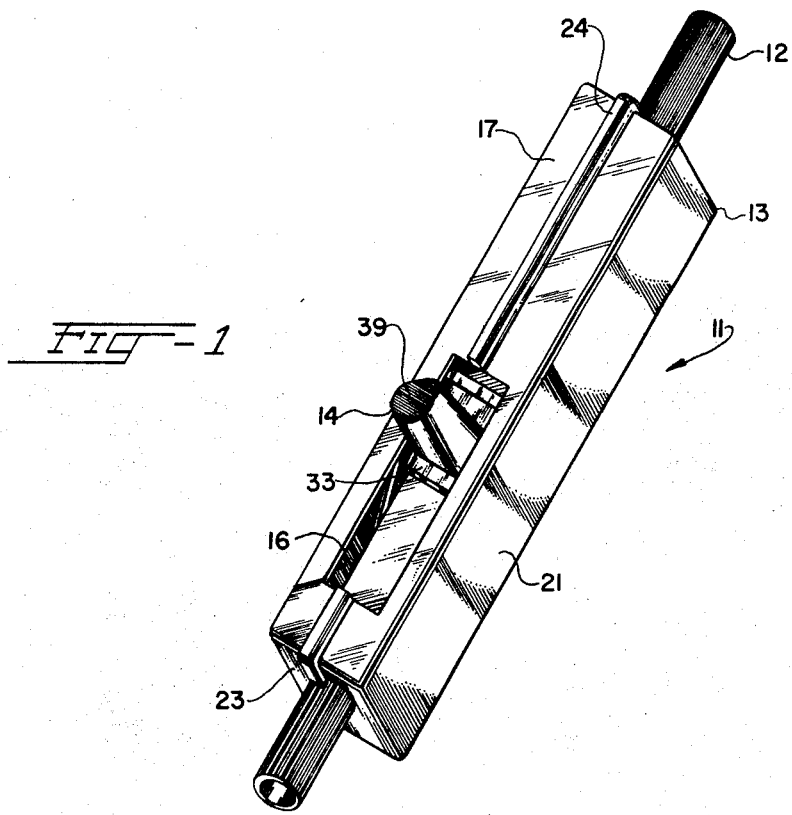

With reference first to FIG. 1 of the drawings, a preferred embodiment of the inventive clamp, generally referred to by the reference numeral 11, is illustrated at a predetermined position along the length of an elastically deformable tube 12. It can be seen from this Figure that the various components of the clamp which are movable and are responsible for providing the desired clamping action are all enclosed by an elongated housing 13 and are not exposed for improper manipulation and damage. The only movable portion of the clamp which is readily accessible outside of the housing is an actuating button 14 which extends upwardly through a longitudinally disposed slot 16 in the housing upper wall. Because of mechanism to be explained hereinafter, movement of the button 14 longitudinally along the slot actuates the clamping components and enables them to be positioned as desired. Thus, the only portion of the clamp which is readily available for manipulation is that portion (the button 14) which properly causes operation of the clamp.

Figure 2:
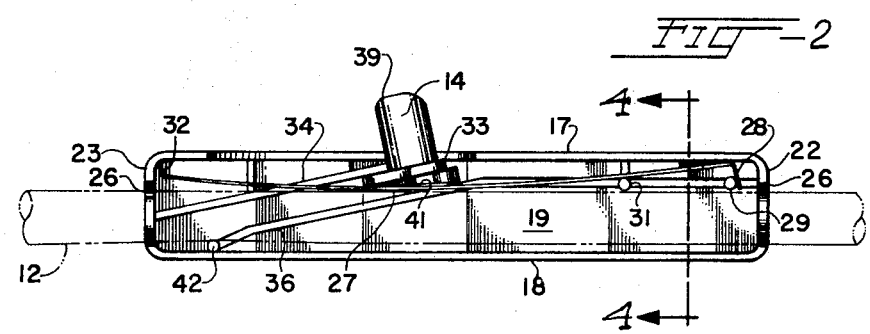
FIG. 2 is a sectional view taken longitudinally through the clamp illustrating its interior construction and showing the clamping mechanism in its open position.
Figure 3:
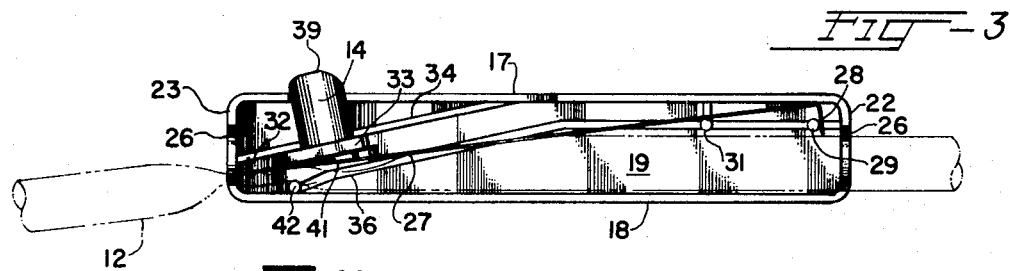
FIG. 3 is a sectional view similar to that of FIG. 3 but showing the clamping mechanism at a different position of adjustment and deforming the tube.
Figure 4:
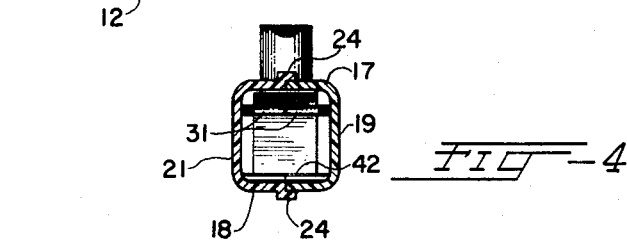
FIG. 4 is a sectional view of the clamp taken on a plane indicated by the line 4—4 in FIG. 2 illustrating certain aspects of its construction.

As is best illustrated in FIGS. 2–4, the housing 13 is an elongated rectangular prism in shape which is generally hollow and made of top and bottom rectangular walls 17 and 18, side rectangular walls 19 and 21, and generally square-shaped end walls 22 and 23. Such housing may be formed of any suitable material such as a hard synthetic plastic, either a thermoplastic or preferably one of the various thermosetting resins, and it is molded in two halves which meet along a midplane extending longitudinally through the top and bottom walls 17 and 18. As shown in FIG. 4, a raised rib 24 is provided along the edge of one half of the housing and extends outwardly therefrom to form a channel encompassing the edge of the other housing half to facilitate securance of such edges together, as by means of an epoxy adhesive.

The housing 13 has a passageway extending longitudinally therethrough for reception therein of the tube 12. More particularly, each of the end walls 22 and 23 is provided with a circular opening 26 having a diameter which generally conforms to the external diameter of the tube 12. The tube 12 extends through such openings and lies within the housing on a path or along an axis defined by the location of the openings.

As mentioned previously, the components of the clamp responsible for providing the actual clamping action are located within the housing. One of such components is an elongated leaf spring 27 that extends longitudinally within the housing for substantially its entire length along one side of the passageway therethrough. One end of the spring 27 is held or constrained in a generally fixed position adjacent the end wall 22 of the housing. That is, the end of the spring 27 adjacent such end wall is downwardly bent through an angle of approximately 90 degrees to provide a downwardly extending lip 28. A pair of transversely extending pins 29 (only one of which is shown) extend inwardly in axial alignment with each other from the opposite side walls 19 and 21 of the housing adjacent the end wall 22, and they provide abutments or blocks preventing movement of the lip 28 and, hence, of the entire spring 27 inwardly toward the end wall 22, or toward the left as viewed in FIG. 2, beyond the limit defined by engagement of the lip with the blocks. Movement of the spring 27 in the opposite direction is limited by abutment of the lip 28 with the end wall 22 of the housing.

A second pair of transversely extending axially aligned pins 31, identical to the pins 29, also extend inwardly of the opposite side walls 19 and 21. Such pins 31 are in alignment longitudinally with the pins 29 but are spaced inwardly therefrom toward the lateral midplane of the housing. As seen from FIG. 2, the pins 29 and 31 cooperate with the upper wall 17 of the housing to provide a bias on spring 27 tending to urge the same upwardly toward the wall 17. In this connection, the end of spring 27 opposite the lip 28 is provided with an upwardly extending lip 32 which engages top wall 17 of the housing and prevents upward pivoting of the spring 27 beyond a predetermined location therefor at the side of the tube passageway, and it also establishes a smooth edge or surface engageable with the tube 12 without damaging the same.

Means are provided within the housing for urging the spring 27 into the passage way so that it will deform the wall of any tube 12 therein and thus partially restrict or completely stop flow therethrough, as desired. Such means comprises a slide 33 located within the housing on the side of the spring opposite the tube passageway. The slide is constrained within the housing for reciprocable movement along the axis of the spring 27 on a path which has a component extending laterally into the passageway so that upon such movement, the slide will engage the spring and cammingly force it into the passageway. More particularly, the slide 33 extends between the opposite side walls 19 and 21 of the housing and has its side edges slidably engaged within tracks on such side walls which define its path of movement. A pair of vertically spaced and generally parallel ledges extend inwardly toward the center of the housing from the inner surface of each of the side walls 19 and 21 thereof to define the tracks, and opposite side edges of the slide are received between the paired ledges on the respectively associated side walls to ride in the tracks and thereby provide the desired constraint on the movement of the slide. As is illustrated, the ledges extend angularly along the side walls so that the path for the slide has a directional component extending longitudinally of the housing as well as one which extends laterally into the passageway. It is to be noted that although the lower ledge 36 on each wall flares outwardly away from the ledge 34 at a location toward the bottom wall 18, such outward flare is beyond a position in the path of the slide at which it will adversely affect its movement. The previously mentioned actuating button 14 for the clamp is provided as a part of the slide 33 and extends upwardly therefrom through the slot 16.

It will be appreciated from the above that displacements of the button 14 along the length of the slot 16 will result in the slide 33 being moved therewith along its path of travel defined by the tracks. In this connection, the upper surface 39 of the button 14 is knurled to facilitate frictional engagement therewith by an operator's thumb or the like. Moreover, the lower surface of the slide 33 is provided therealong with a wedge shaped portion 41 which slidably engages the spring 27 when the slide is moved. Such slide surface is angularly related to the remainder of the slide in a manner assuring that it remains generally parallel and in engagement along its full length with the spring 27 as the slide is moved along its angular path. Thus, the slide and the spring 27 slidably engage one another over a relatively large area, thereby minimizing wear of the engaging surfaces and increasing the area of friction defined therebetween.

By comparing FIGS. 2 and 3, one can determine the effect on the tube 12 of moving the button 14 forwardly in the slot toward end wall 23 of the housing. Such movement of the slide 33 forces the spring 29 laterally inwardly into the passageway and into engagement with the tube 12 to deform the same and thereby restrict the size of the flow passage therethrough with the result that fluid flow through the tube is either reduced or stopped, depending upon the extent to which the tube is deformed. In this connection, it is to be noted that the leaf spring 27 extends longitudinally within the housing for a substantial distance beyond the ends of the path over which the slide 33 is movable and is curved upwardly and away from the tube 12. Because of this relationship, and because of the fact that the end of the spring having the downwardly-turned lip 28 thereat is held generally at one location, the slide causes a progressive levering or pivoting action on the spring which moves the curved end thereof having the upwardly-turned lip 32 a greater distance downwardly into the tube passageway than the slide itself moves. Thus, the lateral movement of the slide is magnified or enhanced so that longitudinal displacements thereof over relatively short distances will provide corresponding but larger lateral movement of the spring to progressively deform the tube to gradually meter the flow therethrough and finally to close the tube completely. This enables the user to completely block the passageway with one thumb stroke without repositioning his hand if he is gripping the clamp by the housing thereof. In an emergency situation, the simplicity of function and time saving thus provided can be quite important.

As a salient feature of the instant invention, it includes means which assures that the clamp stays in a desired position of adjustment along the length of the tube. More particularly, a projection in the form of a rib 42 projects inwardly a slight distance into the passageway from the inner surface of the bottom wall 18 of the housing. As is illustrated in FIG. 2, such rib 42 cooperates with the spring 27, which at all times urges the tube 12 against the rib, in slightly deforming the tube along the rib to frictionally engage the same even when the spring is in its fully open position and is not, therefore, being urged into the passageway to close the tube. The result of this frictional engagement is that a positive intentional force is required to move the clamp along the tube and, hence, the clamp tends to remain at any location at which it is positioned along the tube.

It is to be noted that the rib 42 is disposed on the bottom wall of the housing at a location approximately directly opposite the location on the wall of the tube which is engaged by the spring along the natural bow or curvature thereof. The slight deformation of the tube provided by the rib 42 thus cooperates with the tube deformation provided by inward movement of the spring to sharply define the location at which the opposite walls of the tube come together to pinch the same and effect closure thereof. A positive clamping action is therefore provided.

From the above description, it will be seen that the clamp of the invention is quite simple and yet has advantageous features not present in prior clamps of a generally similar type. For example, all portions of the clamping mechanism are enclosed in the housing where they are normally protected from damage and are kept clean. Moreover, the clamp is quite simply provided with friction means which hold it in any position of adjustment along the tube. All parts of the clamp can be inexpensively made, and all except the spring 27 are of molded plastic and easily assembled. The clamp 11 functions as a metering as well as an open-close device and is in the nature of a valve in which the spring 27 serves as the valve element and the slide 33 forms the control therefor.

While the invention has been described in connection with one preferred embodiment thereof, it will be appreciated by those skilled in the art that various changes and modifications can be made without departing from the spirit of the invention. It is therefore intended that the coverage afforded applicant be limited only by claims and their equivalent.

What is claimed is:

1. A clamp for selectively metering and stopping fluid flow through a compressible tube or the like, said clamp comprising: an elongated hollow housing having a passageway extending longitudinally completely therethrough for reception of an elastically deformable portion of a tube at a selectable location therealong at which it is desired to be able to meter or stop flow therethrough, an elongated leaf spring constituting a valve element supported within said housing along one side of said passageway from movement between open and closed positions and normally being biased toward the open position thereof and substantially outwardly of said passageway, a control element slidably mounted within said housing and being constrained therewithin for reciprocable displacements along an inclined path extending both longitudinally and laterally into said passageway for flexing said valve element into said passageway resiliently against the wall of a tube therein to deform the same and thereby restrict fluid flow therethrough, the area of contact between said tube and said valve element in the closed position thereof being substantially the greater length of the portion of said tube within said housing, and actuating means secured to said control element and extending outwardly from said housing to a location at which it is readily accessible for manipulation to displace said control element to the extent desired.

2. The clamp of claim 1 wherein said slidable control element extends within said housing between opposite side walls therof, and said side walls having tracks on the inner side thereof, the opposite side edges of said control element being received within said tracks which provide said constraint for movement only along said path, said tracks being respectively defined by spaced and generally parallel ledges.

3. The clamp of claim 2 wherein said leaf spring extends longitudinally within said housing substantially the length of said tracks and is held at a fixed location against substantial longitudinal movement whereby displacements of said control element causes the lateral tube-deforming movement of said spring to be greater than the corresponding lateral movement of said control element.

4. The clamp of claim 2 wherein a fixed projection from said wall extends into said passageway from the wall of said housing on the side of said passageway opposite the side thereof at which said spring is located and is positioned therealong directly opposite the location at which said spring engages said tube, whereby said projection cooperates with said spring in providing the deformation of said tube for restricting the same when said spring is moved toward its closed position.

* * * * *